Feb. 27, 1962  W. J. BRADLEY  3,022,585
TRENCHING MACHINE DRIVE TRANSMISSION
Filed Sept. 11, 1959  3 Sheets-Sheet 1

INVENTOR.
WILLIAM J. BRADLEY
BY William S. Grant
ATTORNEY.

INVENTOR.
WILLIAM J. BRADLEY

Willard S. Grow
ATTORNEY.

Feb. 27, 1962 W. J. BRADLEY 3,022,585
TRENCHING MACHINE DRIVE TRANSMISSION
Filed Sept. 11, 1959 3 Sheets-Sheet 3

INVENTOR.
WILLIAM J. BRADLEY

ATTORNEY.

United States Patent Office 3,022,585
Patented Feb. 27, 1962

3,022,585
TRENCHING MACHINE DRIVE TRANSMISSION
William J. Bradley, North Hollywood, Calif., assignor to Earth Equipment Corp'n., Los Angeles, Calif., a corporation of California
Filed Sept. 11, 1959, Ser. No. 839,449
1 Claim. (Cl. 37—86)

This invention pertains to trenching machine transmission mechanism and is particularly directed to an improved heavy duty transmission for raising and lowering the bucket chain line and for driving said chain line in any vertical position of the trenching unit.

One of the objects of this invention is to provide an improved rugged transmission of simple design and trouble-free operation for driving the bucket chain line of a trenching machine for any vertical position of the trenching machine unit on the tractor upon which it is mounted.

Still another object of this invention is to provide a drive chain transmission to the movable bucket chain line frame in which there is no lost motion, idler units, or other flexible power transmission means utilized for driving the bucket chain line of the trenching unit.

Still another object of this invention is to provide an improved drive transmission from the power output of a tractor to a trenching machine unit mounted thereon utilizing a minimum of moving parts and providing a positive heavy duty drive at all times to the bucket chain line for any vertical position of the chain line unit on the tractor.

Still another object of this invention is to provide a transmission mechanism of the aforementioned type which effects a minimum of interference with the flow of dirt and materials during the operation of the bucket chain line unit.

And it is also an object of this invention to provide a bucket chain line drive unit from the power takeoff of a tractor which is not affected by the materials being dug and is free from being contaminated and damaged in that regard by the materials being raised from the trench by the trenching machine bucket chain line associated with the device.

Further features and advantages of this invention will appear from a detailed description of the drawings in which.

Figure 1:
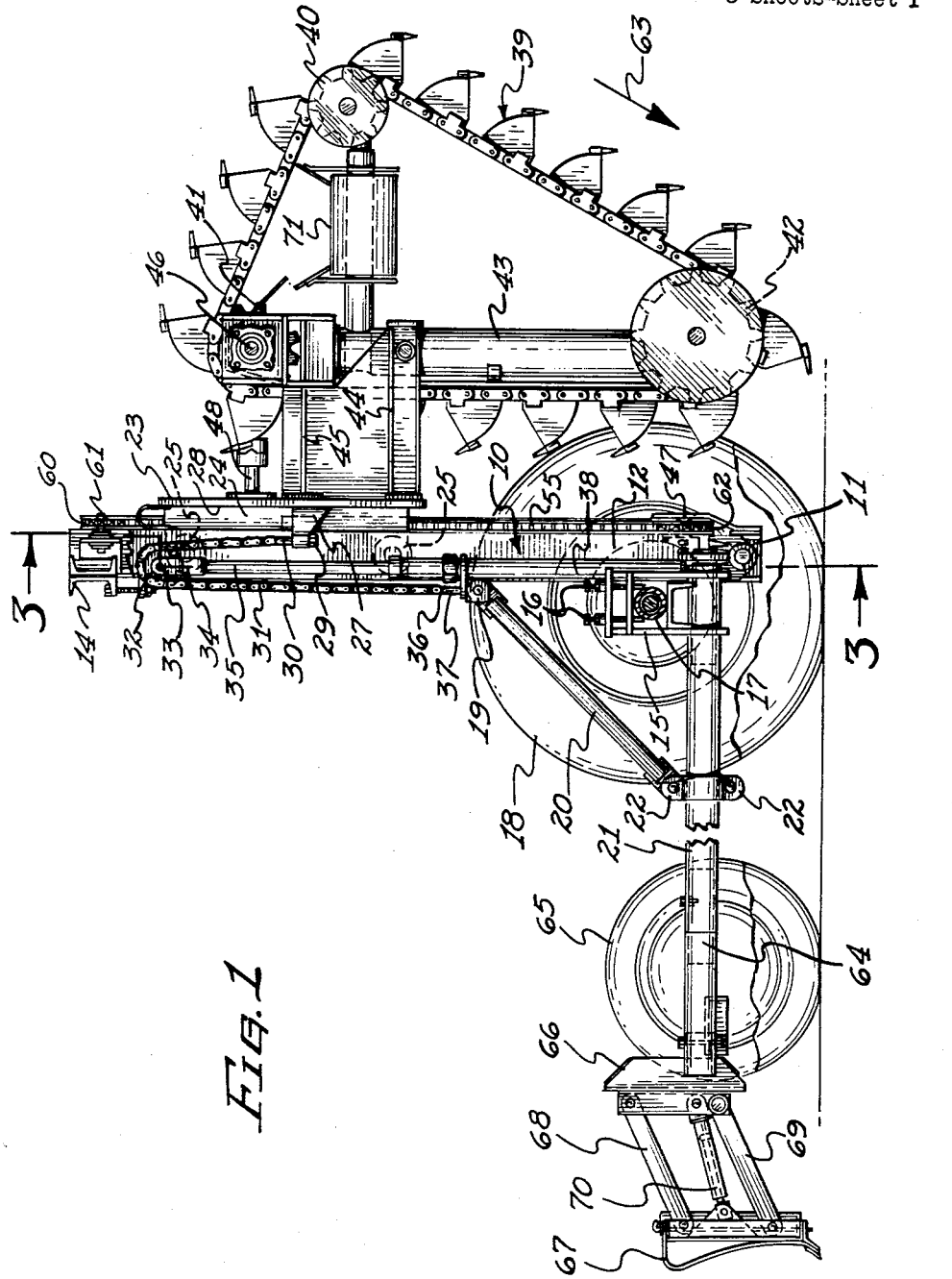
FIG. 1 is an enlarged side elevation of a trenching machine unit incorporating the features of this invention.

As an example of an embodiment of this invention there is shown a trenching machine unit incorporating the features of this invention having a frame indicated generally at 10 comprising a bottom tie bar member 11 to which are fixed the upstanding columns 12 and 13 which are connected together at the top by suitable top tie bar 14. The lower portions of the columns and the bottom tie bar are rigidly fixed to the clamping bracket 15 having suitable clamp bolt means 16 for securing the frame to the axle housing 17 of a conventional tractor having the usual main drive wheels 18. An intermediate cross member 19 is also rigidly fixed to the upstanding columns 12 and 13 and is connected by the truss rods 20 to the forward extensions 21 of the frame 10, which truss rods in turn are connected thereto by suitable clamps 22.

Figure 2:
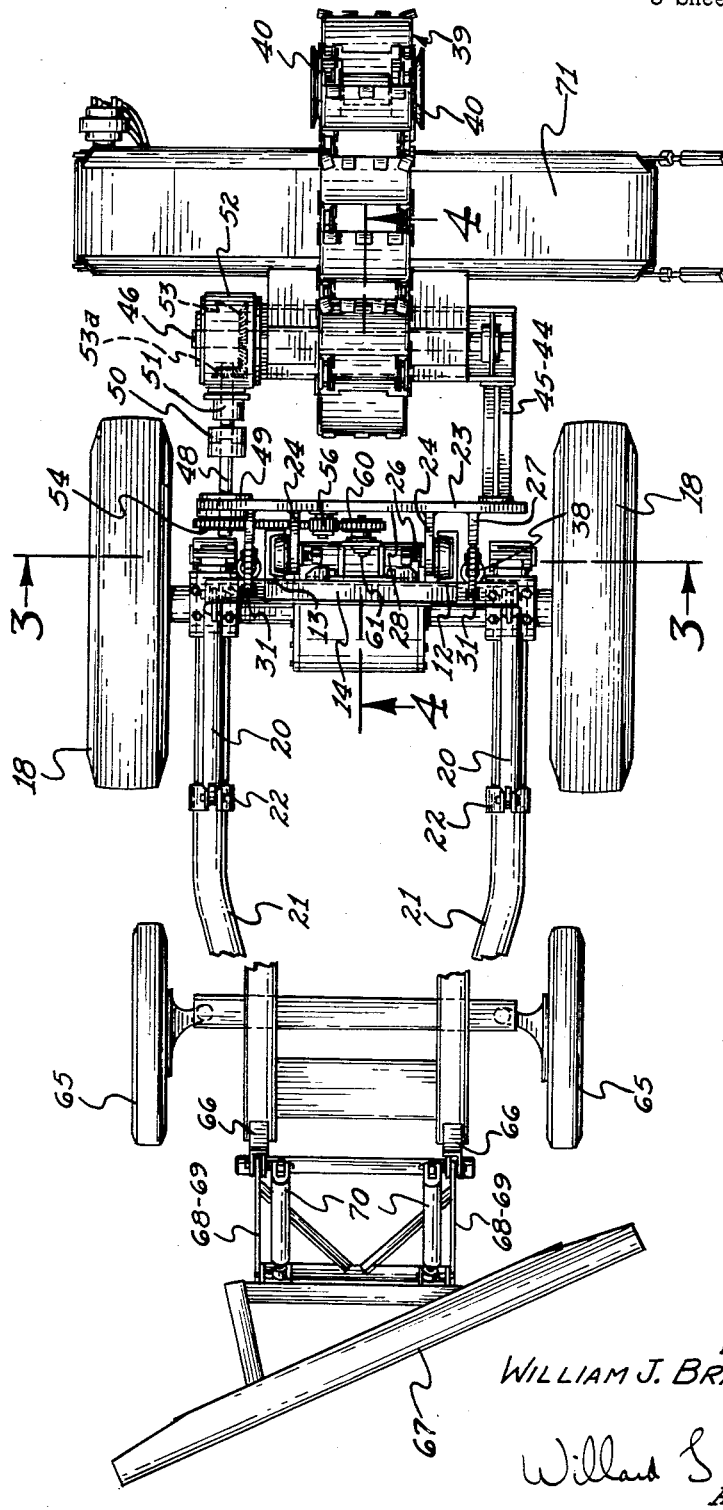
FIG. 2 is a plan view of the apparatus shown in FIG. 1.
Figure 3:
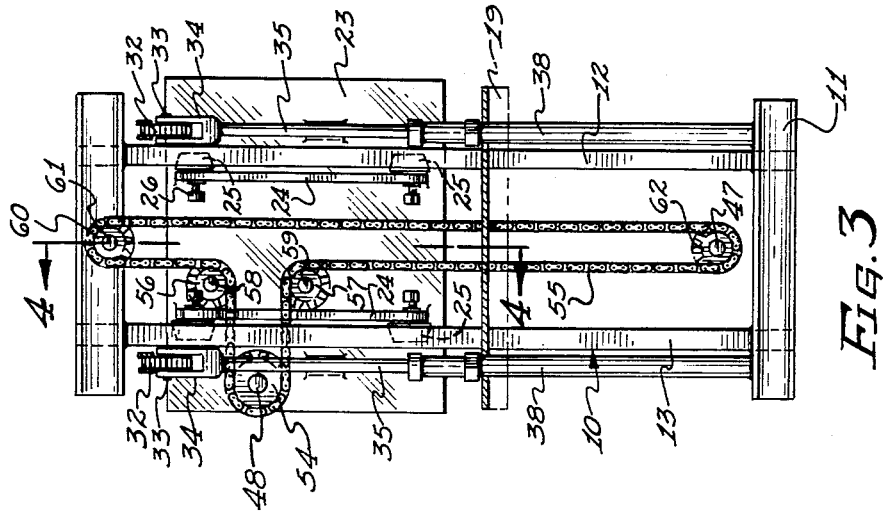
FIG. 3 is an enlarged fragmentary section on the line 3—3 of FIGS. 1 and 2 particularly showing the drive transmission from the power takeoff of the tractor to the bucket chain line of the trenching machine unit.
Figure 4:
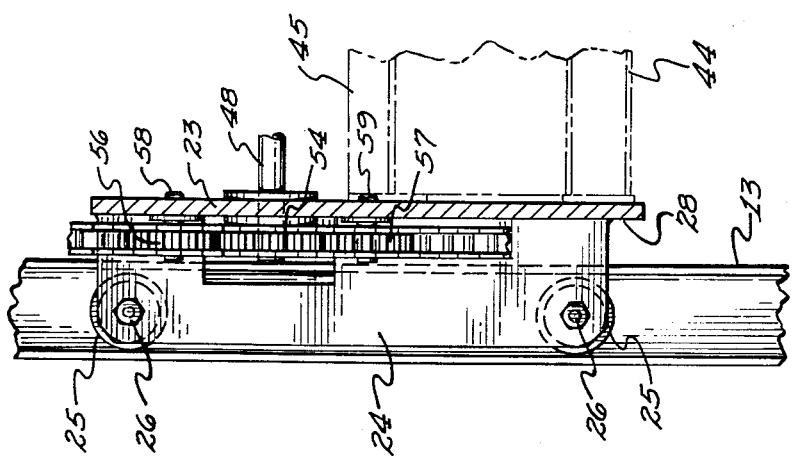
FIG. 4 is an enlarged fragmentary section on the line 4—4 of FIGS. 2 and 3.

A vertically reciprocable plate 23, FIG. 4, is provided with forwardly projecting brackets 24 rigidly fixed thereto upon the outer ends of which are journaled the guide rollers 25. The rollers 25 are carried on suitable studs 26 fixed in the brackets 24 and which rollers nicely fit in the channel portions of the upstanding columns 12 and 13 as best shown in FIG. 2. By this arrangement the plate is accurately guided up and down in vertical movements at all times.

Lifting lugs 27 are fixed to the forward face 28 of the plate 23 and have eyebolts 29 mounted therein to which are connected the ends 30 of the lifting chains 31. These chains proceed from the eyebolts 30 upwardly over idler sprockets 32 journaled on suitable pins 33 in the bifurcated upper ends 34 of the piston rods 35 of the elevating cylinders 38 suitably fixed to the frame 10 of the unit. The other ends 36 are fixed to suitable pins 37 in turn fixed to the frame 10 of the machine. Thus as fluid pressure is applied in the cylinders 38 exerting pressure on the piston rod or retracting the piston rod, the idler sprocket 32 allows the unit plate 23 to be moved up and down in the guide rail columns 12 and 13 for the desired depth and profile of the trench to be cut or to retract the trenching unit fully upwardly away from the ground surface for road travel.

The trenching unit bucket chain line indicated generally at 39 is carried on appropriate sprockets 40, 41 and 42 suitably journaled on the chain line frame indicated generally at 43 which frame in turn is rigidly secured to the plate 23 by suitable brackets 44 and 45 so that the bucket chain line unit 39 comprising the members 23, 44 and 45 moves up and down with the plate 23. The sprocket 41 is fixed on the input drive shaft 46 of the bucket chain line which must be driven from the power takeoff shaft 47 of the tractor, for any vertical position of the plate 23 and bucket chain line 39 relative to the tractor and upstanding columns 12 and 13. To this end there is provided a transmission shaft 48 journaled in a suitable bearing at 49 in the plate 23 which is coupled by suitable coupling 50 to the bevel pinion shaft 51 journaled in the transmission case 52 fixed to the bucket chain line frame 43 in any suitable manner. Contained within this transmission case 52 is a bevel gear 53 which is driven from the bevel pinion 53a and which bevel gear is fixed on the input drive shaft 46. On the forward end of the transmission shaft 48 is fixed to the sprocket 54 over which operates the power transmission chain 55 which passes over idler sprockets 56 and 57 journaled on suitable studs 58 and 59 respectively fixed to the plate 23. The chain then proceeds upwardly over the idler sprocket 56 over the idler sprocket 60 journaled on the stud 61 fixed on the top tie bar 14 of the main frame 10. The roller chain 55 then extends downwardly and over the drive sprocket 62 fixed to the power output shaft 47 of the tractor upon which the unit is mounted. Thus it will be seen by this arrangement that the chain 55 always maintains the same length and center distance for any vertical position of the plate 23 and the bucket chain line frame 43 with regard to the tractor and ground level operation. It will be further noted that there is no lost motion or idler takeup mechanism or other unsatisfactory yielding or adjustable connecting means from the power takeoff shaft 47 of the tractor to the transmission shaft 48 to drive the bucket chain line in the direction indicated by the arrow 63. If desired, the usual dirt conveyor indicated generally at 71 and carried on the bucket chain line frame 43 in a conventional manner may be driven from the input drive shaft 46 by suitable mechanism (not shown) or by an individual drive motor as desired.

It is to be further noted that the forward extensions 21 of the main frame 10 may project to the front axle 64 of the tractor containing the usual steering wheels 65. On the front of these extensions 21 there may be provided a bracket 66 to which may be mounted the moldboard 67 carried on the parallel links 68 and 69 in turn connected to the brackets 66 and suitable fluid pressure cylinders 70 provided for elevating and lowering the moldboard 67 for the bulldozer operations. Thus the dirt dug out of the trench by the trenching unit may be put back by means of the dozer moldboard 67 both on the self contained L-shaped frame structure comprising the horizontal extensions 21 and the vertical frame structure 10 integrally connected together and mountable and demountable as a unit on a tractor. The L-shaped structure provides special stability, sturdiness and ruggedness to the trenching operations and to the dozing operations as the long extension members 21 may be rigidly and easily secured to both the front and rear portions of the tractor at widely spaced positions resulting in greater stability and strength and overall lightness of the apparatus necessary to carry both the trenching and dozing units.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claim are intended to be included herein.

Having thus fully set forth and described this invention what is claimed and desired to be obtained by United States Letters Patent is:

A trenching machine drive transmission structure for a tractor having a power takeoff shaft and a main frame fixed to said tractor, a vertical plate laterally disposed on said main frame and mounted for vertical reciprocable movement on said main frame, power means on said main frame connected to said plate energizable for vertical movements and positioning of said plate vertically on said main frame, a chain line frame fixed to the rear face of said plate on the opposite side of said plate from said main frame, a bucket chain line journaled on said chain line frame, an input drive shaft for said bucket chain line journaled on said chain line frame, a power transmission connected to the power takeoff of said tractor and connected through said plate to said input drive shaft of said bucket chain line so as to drive said bucket chain line for any vertical position of said plate and chain line frame on said main frame, said power transmission being characterized by a transmission shaft journaled on and extending through said plate having means operatively connecting the rearward end of said transmission shaft to said input drive shaft of said bucket chain line, a sprocket fixed on the front end of said transmission shaft adjacent the forward face of said plate, a pair of idler sprockets journaled on said plate adjacent the forward face of said plate, a third idler sprocket journaled on said main frame, a sprocket fixed to the output shaft of said tractor, and an endless chain operating over said sprocket on said transmission shaft extending over one of said idler sprockets on said plate then over said third idler and over said sprocket on said power takeoff shaft of said tractor and then finally over said other idler on said plate back to said sprocket on said transmission shaft.

References Cited in the file of this patent
UNITED STATES PATENTS

| | | |
|---|---|---|
| 428,886 | Brown | May 27, 1890 |
| 940,752 | Toupin | Nov. 23, 1909 |
| 1,050,361 | Halle | Jan. 14, 1913 |
| 1,108,268 | Stahl | Aug. 25, 1914 |
| 1,531,755 | Radovich | Mar. 31, 1925 |
| 1,733,427 | Ruth | Oct. 29, 1929 |
| 1,866,037 | Heim | July 5, 1932 |
| 2,084,887 | Bennett | June 22, 1937 |
| 2,737,733 | Everett | Mar. 13, 1956 |
| 2,762,137 | Wells | Sept. 11, 1956 |
| 2,777,219 | Brant | Jan. 15, 1957 |